(12) United States Patent
Morin et al.

(10) Patent No.: US 12,617,102 B2
(45) Date of Patent: May 5, 2026

(54) ROBOTIC POLISHING SYSTEM AND METHOD FOR USING SAME

(71) Applicant: Pratt & Whitney Canada Corp., Longueuil (CA)

(72) Inventors: Philippe Morin, Beloeil (CA); Canam Hoang, Longueuil (CA); Jean-Francois Collette, Montreal (CA); Pierre-Luc Nault, Sainte-Julie (CA); Guillaume Whittom, Longueuil (CA); Thomas Roux, Montreal (CA); Guillaume Fortier, Saint-Sauveur (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 316 days.

(21) Appl. No.: 18/397,942

(22) Filed: Dec. 27, 2023

(65) Prior Publication Data

US 2024/0208072 A1    Jun. 27, 2024

Related U.S. Application Data

(60) Provisional application No. 63/435,484, filed on Dec. 27, 2022.

(51) Int. Cl.
B25J 11/00          (2006.01)
B24B 21/16          (2006.01)
(Continued)

(52) U.S. Cl.
CPC ........... B25J 11/0065 (2013.01); B25J 9/161 (2013.01); B25J 15/0019 (2013.01)

(58) Field of Classification Search
CPC .... B25J 11/0065; B25J 9/161; B25J 15/0019; B24B 21/20; B24B 21/165
See application file for complete search history.

(56) References Cited

U.S. PATENT DOCUMENTS 7,886,929 B2 *   2/2011   L'helgoualc'h ........ B24B 21/18
                                                         221/92
8,135,208 B1 *   3/2012   Vangal-Ramamurthy ..................
                                                          G06T 7/80
                                                          700/254

(Continued)

FOREIGN PATENT DOCUMENTS

CN          205588102 U   *   9/2016
CN          110315411 A   *  10/2019   ............. B24B 21/18
(Continued)

OTHER PUBLICATIONS

EP Search Report for EP Patent Application No. 23220652.4 dated Sep. 18, 2024.

*Primary Examiner* — Harry Y Oh
(74) *Attorney, Agent, or Firm* — Getz Balich LLC

(57)          ABSTRACT

A polishing system includes a robotic polishing assembly, a belt removal assembly, and a controller. The robotic polishing assembly includes an end effector. The end effector includes a polishing arm, a motor, and a tool head. The tool head extends along a lengthwise axis between and to an inner end and a tip end. The tool head includes a belt tensioner, a roller, and an abrasive belt. The belt tensioner is configured to bias the tip end outward from the inner end. The abrasive belt is disposed on the motor and the roller. The belt removal assembly includes a first lateral arm, a second lateral arm, and a back stop. The controller includes a processor in communication with a non-transitory memory storing instructions, which instructions when executed by the processor, cause the processor to: identify an end-of-life condition is present for the abrasive belt and remove the abrasive belt from the tool head.

20 Claims, 8 Drawing Sheets

(51) Int. Cl.
    *B24B 21/20*     (2006.01)
    *B25J 9/16*     (2006.01)
    *B25J 15/00*     (2006.01)

(56)            References Cited

U.S. PATENT DOCUMENTS

| | | | | |
|---|---|---|---|---|
| 10,792,779 | B2 * | 10/2020 | Kosonen | B24B 21/18 |
| 2010/0248591 | A1 * | 9/2010 | Marconi | B24B 49/12 |
| | | | | 451/6 |
| 2011/0190790 | A1 * | 8/2011 | Summerer | A61B 34/76 |
| | | | | 606/130 |
| 2018/0345443 | A1 * | 12/2018 | Ho | B24B 23/06 |
| 2020/0070349 | A1 * | 3/2020 | Yoshida | B25J 9/1612 |
| 2021/0308825 | A1 * | 10/2021 | Gabriel | B24B 49/10 |
| 2022/0379430 | A1 * | 12/2022 | Kahari | B24B 49/10 |
| 2023/0087376 | A1 * | 3/2023 | Sakaishi | B23Q 17/22 |
| | | | | 83/331 |

FOREIGN PATENT DOCUMENTS

| | | | | |
|---|---|---|---|---|
| CN | 111390710 B | | 2/2021 | |
| CN | 113199356 A | * | 8/2021 | B24B 21/00 |
| CN | 115008314 A | | 9/2022 | |
| CN | 115070573 A | | 9/2022 | |
| DE | 3904704 C1 | | 4/1990 | |
| FR | 2677289 A | | 12/1992 | |
| JP | H058166 | | 7/1993 | |
| JP | 2002052452 A | | 2/2002 | |

* cited by examiner

700

PERFORM A POLISHING OPERATION ON A WORKPIECE USING AN END EFFECTOR INCLUDING A TOOL HEAD WITH AN ABRASIVE BELT
702

IDENTIFY AN END-OF-LIFE CONDITION FOR THE ABRASIVE BELT
704

REMOVE THE ABRASIVE BELT FROM THE TOOL HEAD
706

ROBOTIC POLISHING SYSTEM AND METHOD FOR USING SAME

This application claims priority to U.S. Patent Appln. No. 63/435,484 filed Dec. 27, 2022, which is hereby incorporated herein by reference in its entirety.

TECHNICAL FIELD

This disclosure relates generally to robotic machining systems, more particularly, to systems and methods for removing an abrasive belt from a robotic machining system.

BACKGROUND OF THE ART

Robotic machining systems may be used to accomplish one or more machining (e.g., polishing) operations for the manufacture of components. Various robotic machining systems are known in the art. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a polishing system includes a robotic polishing assembly, a belt removal assembly, and a controller. The robotic polishing assembly includes an end effector. The end effector includes a polishing arm, a motor, and a tool head. The motor is mounted on the polishing arm. The tool head extends along a lengthwise axis between and to an inner end and a tip end. The inner end is disposed on the polishing arm at the motor. The tool head includes a belt tensioner, a roller, and an abrasive belt. The belt tensioner is configured to bias the tip end outward from the inner end along the lengthwise axis. The abrasive belt is disposed on the motor and the roller. The belt removal assembly includes a first lateral arm, a second lateral arm, and a back stop disposed laterally between the first lateral arm and the second lateral arm. The controller is in signal communication with the robotic polishing assembly. The controller includes a processor in communication with a non-transitory memory storing instructions, which instructions when executed by the processor, cause the processor to: identify an end-of-life condition is present for the abrasive belt using a usage threshold value for the abrasive belt and, in response to identifying the end-of-life condition, remove the abrasive belt from the tool head by controlling the robotic polishing assembly to position the tool head within the belt removal assembly, compress the belt tensioner against the back stop, and move the tool head between the first lateral arm and the second lateral arm.

In any of the aspects or embodiments described above and herein, the back stop may include a first back stop surface and a second back stop surface. The first back stop surface and the second back stop surface may form a notch.

In any of the aspects or embodiments described above and herein, the belt removal assembly may further include a first lateral brush and a second lateral brush. The first lateral brush may be disposed on the first lateral arm and the second lateral brush may be disposed on the second lateral arm.

In any of the aspects or embodiments described above and herein, the robotic polishing assembly may further include a robotic arm. The robotic arm may include a plurality of movable joints extending between and to a base end and a distal end. The end effector may be disposed at the distal end.

In any of the aspects or embodiments described above and herein, the belt removal assembly may further include a belt retention member configured to retain the abrasive belt after the abrasive belt has been removed from the tool head. The belt retention member may include a post extending upward to a distal end, distal end disposed vertically below the first lateral arm and the second lateral arm.

In any of the aspects or embodiments described above and herein, the first lateral arm may include a first belt removal panel and the second lateral arm may include a second belt removal panel. The first belt removal panel may extend in a transverse direction relative to the second belt removal panel.

In any of the aspects or embodiments described above and herein, the first belt removal panel may include a first engagement end, the second belt removal panel may include a second engagement end, the abrasive belt may have a first width, the first engagement end may be laterally spaced from the second engagement end by a second width, and the first width may be greater than the second width.

In any of the aspects or embodiments described above and herein, the belt tensioner may include a tool guide, a tool extension, and a biasing member. The tool guide may be disposed at the inner end. The tool extension may be disposed at the tip end. The biasing member may be configured to bias the tool extension outward from the tool guide along the lengthwise axis.

In any of the aspects or embodiments described above and herein, the instructions, when executed by the processor, may further cause the processor to identify the end-of-life condition by comparing a measured abrasive belt usage value of the abrasive belt to the usage threshold value. The usage threshold value may be a predetermined usage threshold value stored in memory.

In any of the aspects or embodiments described above and herein, the instructions, when executed by the processor, may further cause the processor to move the tool head between the first lateral arm and the second lateral arm by rotating the end effector about the tip end with the tip end pressed against the back stop so that the tool head passes between the first lateral arm and the second lateral arm.

According to another aspect of the present disclosure, a method for removing an abrasive belt from a tool head of an end effector for a robotic polishing system is provided. The method includes identifying an end-of-life condition is present for the abrasive belt and, in response to identifying the end-of-life condition, removing the abrasive belt from the tool head by positioning the tool head within a belt removal assembly. The belt removal assembly includes a first lateral arm, a second lateral arm, and a back stop disposed laterally between the first lateral arm and the second lateral arm. The method further including removing the abrasive belt from the tool head by: loosening the abrasive belt on the tool head by pushing the tool head against the back stop and moving the tool head between the first lateral arm and the second lateral arm.

In any of the aspects or embodiments described above and herein, the belt removal assembly may further include a first lateral brush and a second lateral brush. The first lateral brush may be disposed on the first lateral arm and the second lateral brush may be disposed on the second lateral arm. The method may further include moving the tool head between and through the first lateral brush and the second lateral brush.

In any of the aspects or embodiments described above and herein, the method may further include collecting the removed abrasive belt with a belt retention member.

In any of the aspects or embodiments described above and herein, identifying the end-of-life condition is present for the abrasive belt may include comparing a measured abrasive belt usage value for the abrasive belt to a predetermined usage threshold value.

In any of the aspects or embodiments described above and herein, the back stop may include a first back stop surface and a second back stop surface. The first back stop surface and the second back stop surface may form a notch. Pushing the tool head against the back stop may include positioning the tool head within the notch.

According to another aspect of the present disclosure, a belt removal assembly includes a back portion, a first lateral arm, a second lateral arm, and a back stop. The first lateral arm extends longitudinally outward from the back portion. The first lateral arm includes a first arm body and a first belt removal panel. The first arm body includes a first top side and a first bottom side. The first belt removal panel is disposed on the first bottom side. The second lateral arm extends longitudinally outward from the back portion. The second lateral arm is laterally spaced from the first lateral arm. The second lateral arm includes a second arm body and a second belt removal panel. The second arm body includes a second top side and a second bottom side. The second belt removal panel is disposed on the second bottom side. The back stop is disposed at the back portion laterally between the first lateral arm and the second lateral arm. The back stop includes a first back stop surface and a second back stop surface. The first back stop surface and the second back stop surface form a notch at an intersection of the first back stop surface and the second back stop surface. The intersection extends vertically between the first lateral arm and the second lateral arm.

In any of the aspects or embodiments described above and herein, the belt removal assembly may further include a first lateral brush and a second lateral brush. The first lateral brush may be disposed on the first top side and the second lateral brush may be disposed on the second top side.

In any of the aspects or embodiments described above and herein, the first belt removal panel may extend in a transverse direction relative to the second belt removal panel.

In any of the aspects or embodiments described above and herein, the belt removal assembly may further include a belt retention member disposed laterally between the first lateral arm and the second lateral arm.

In any of the aspects or embodiments described above and herein, the belt retention member may include a post extending upward to a distal end. The distal end may be disposed vertically below the first lateral arm and the second lateral arm.

The present disclosure, and all its aspects, embodiments and advantages associated therewith will become more readily apparent in view of the detailed description provided below, including the accompanying drawings.

DETAILED DESCRIPTION

Figure 1:
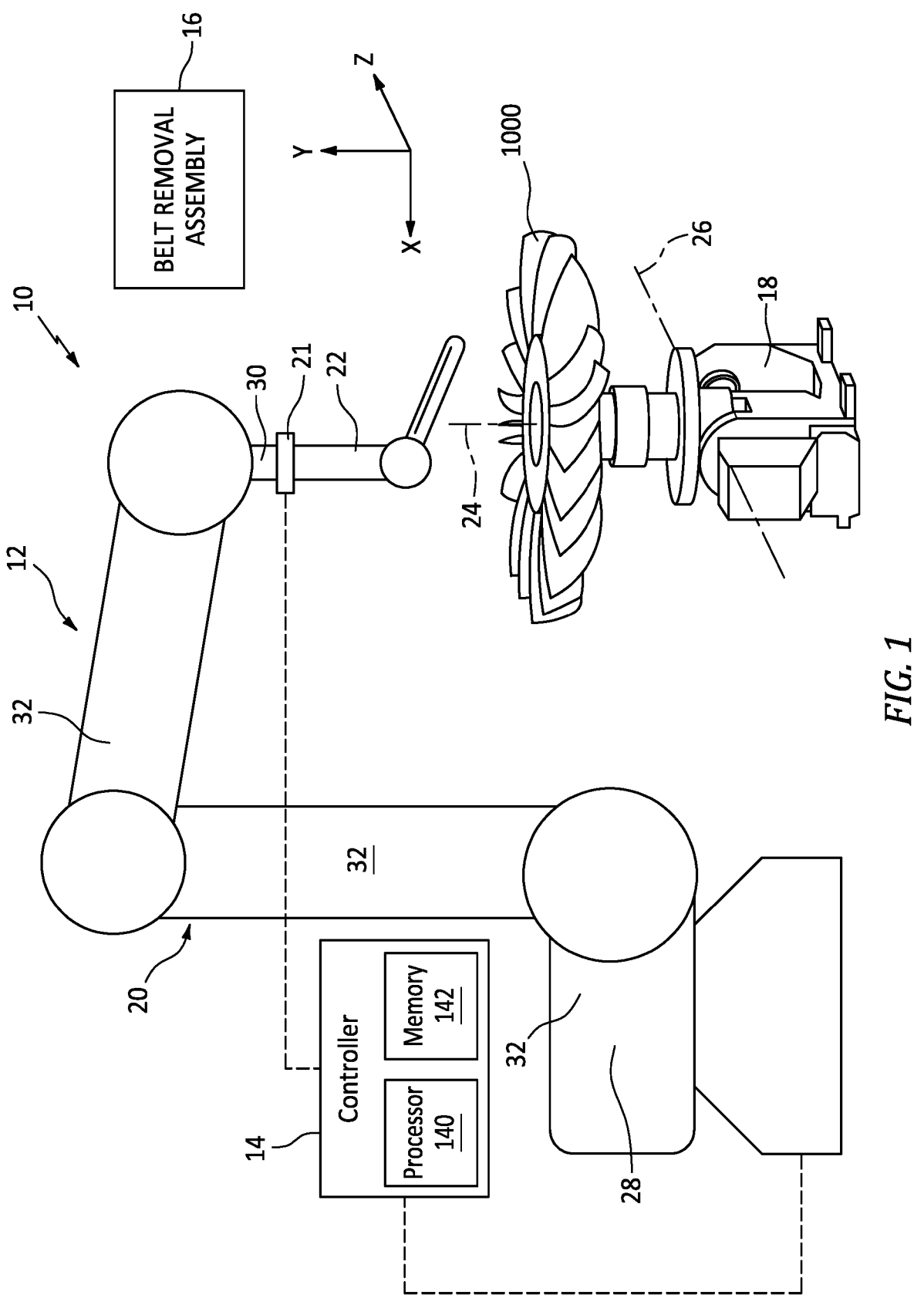
FIG. 1 diagrammatically illustrates a polishing system, in accordance with one or more embodiments of the present disclosure.

FIG. 1 illustrates a polishing system 10 for use in the manufacture of a workpiece 1000. The present disclosure polishing system 10 may provide particular utility when implemented for polishing workpiece 1000 surfaces having complex curvatures, restrictive machining tolerances, and/or hard metals or metal alloys such as, but not limited to, titanium. As an example, the workpiece 1000 of FIG. 1 is a bladed disk ("blisk") for a gas turbine engine fan for an aircraft propulsion system. The present disclosure, however, is not limited to any particular workpiece 1000 type, configuration, or material. Moreover, while the polishing system 10 is discussed herein with respect to the performance of polishing processes, aspects of the present disclosure may also be applicable to grinding or other machining processes. The polishing system 10 of FIG. 1 includes a robotic polishing assembly 12, a controller 14, and a belt removal system 16. The polishing system 10 may be located within or otherwise include an enclosure (not shown) to contain dust and/or other particulate (e.g., titanium dust) which may be produced during a polishing process and which may present fire and/or explosion risk.

The robotic polishing assembly 12 of FIG. 1 provides automated control of one or more machining tools (e.g., polishing tools) based on coded programming instructions executed by a controller (e.g., the controller 14). The robotic polishing assembly 12 of FIG. 1 includes a workpiece positioning fixture 18, a robotic arm 20, a force control device 21, and an end effector 22. To be clear, this robotic polishing assembly 12 configuration of FIG. 1 is exemplary, and the present disclosure polishing system 10 is not limited to use with the particular robotic polishing assembly 12 configuration of FIG. 1.

The workpiece positioning fixture 18 is configured to securely retain and position the workpiece 1000 for a polishing process and/or another machining process. For example, the workpiece positioning fixture 18 may be configured to rotate the workpiece 1000 a first axis 24. The workpiece positioning fixture 18 may additionally or alternatively be configured to rotate (e.g., tilt the workpiece 1000) about a second axis 26. The second axis 26 may be perpendicular to the first axis 24.

The robotic arm 20 includes a base end 28, a distal end 30, and one or more moveable joints 32. Each movable joint 32 may be moved or otherwise controlled, for example, by an independent servo motor or other actuator (not shown). The distal end 30 is connected to the end effector 22. The robotic arm 20 is configured move the end effector 22 relative to the workpiece 1000 and/or to another component or assembly (e.g., a cleaning assembly) of the polishing system 10. For example, the robotic arm 20 may be configured to move the end effector 22 along an x-axis, a y-axis, and a z-axis, as well as to rotate the end effector 22 relative to the x-axis, the y-axis, and the z-axis (e.g., pitch, yaw, and roll).

The force control device 21 connects the robotic arm 20 to the end effector 22. The force control device 21 may be mounted on the distal end 30 of the robotic arm 30. The force control device 21 may be disposed at (e.g., on, adjacent, or proximate) the end effector 22 and may be directly or indirectly mounted to the end effector 22. The force control device 21 may be configured as an active contact flange including a pneumatic linear actuator (e.g., a bellow-type pneumatic linear actuator) or other linear actuator configured to translate along an axis (e.g., a single, linear axis) to control a position of the end effector 22 relative to the robotic arm 20. The active contact flange 21 may additionally include a compressor and/or a pressure control assembly (e.g., a pressure control valve) configured to control an air pressure within the pneumatic linear actuator and, thereby, control a linear position of the pneumatic linear actuator including a fully extended position, a fully retracted position, or a plurality of intermediate linear positions between the fully extended position and the fully retracted position. The force control device 21 may additionally include a pressure sensor configured to measure an air pressure within the pneumatic linear actuator. The force control device 21 may be connected in signal communication with the controller 14, for example, to facilitate positional control of the force control device 21 by the controller 14 and to transmit pressure measurements from the pressure sensor to the controller 14. The pressure measurements from the pressure sensor may facilitate calculation, by the controller 14, of force applied (e.g., to a workpiece) by the end effector 22. Exemplary configurations of the force control device 21 may include, but are not limited to, those sold under the ACF® trademark by FerRobotics Compliant Robot Technology GmbH (Austria).

Figure 2:
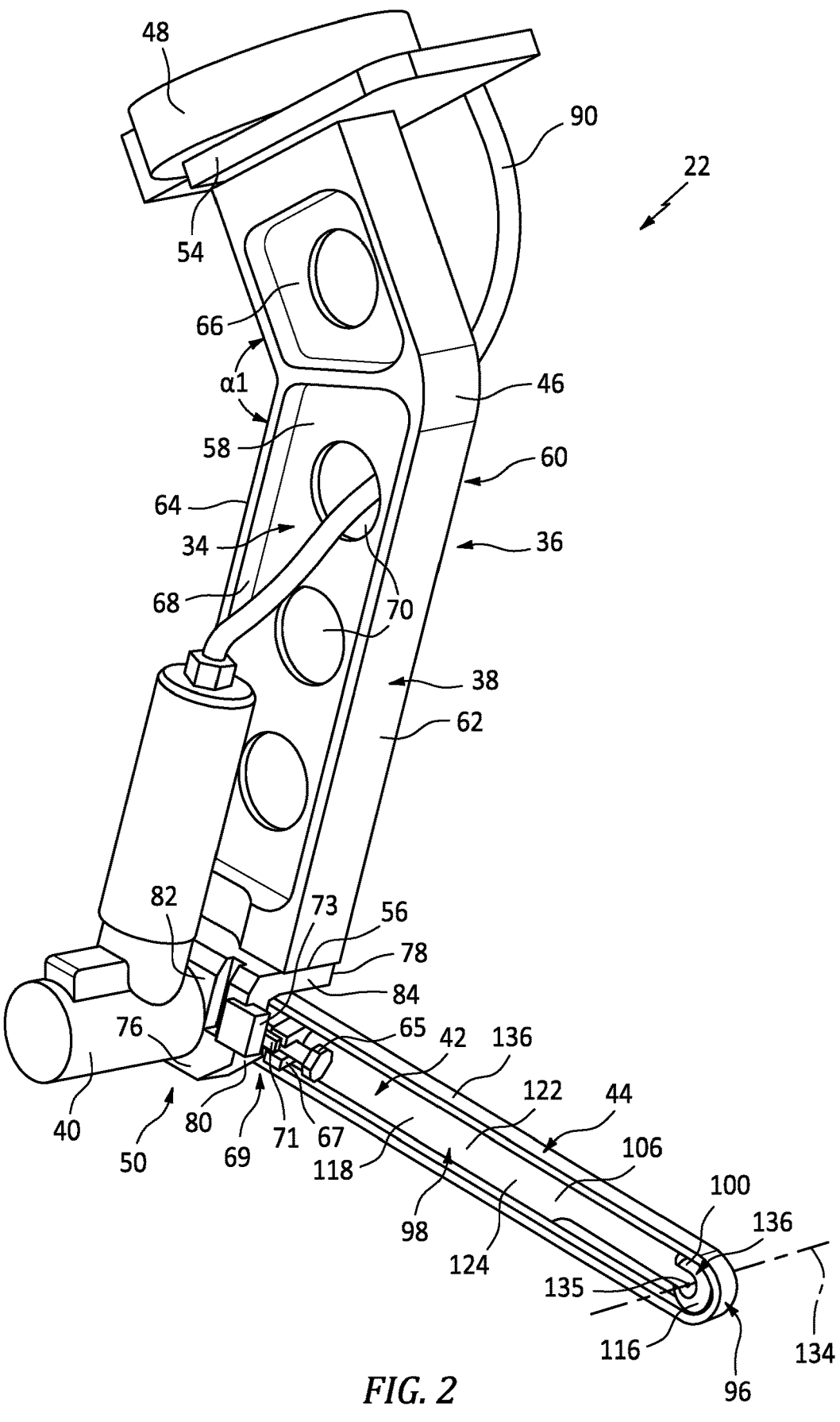
FIG. 2 illustrates a perspective view of an end effector for a polishing system, in accordance with one or more embodiments of the present disclosure.
Figure 3:
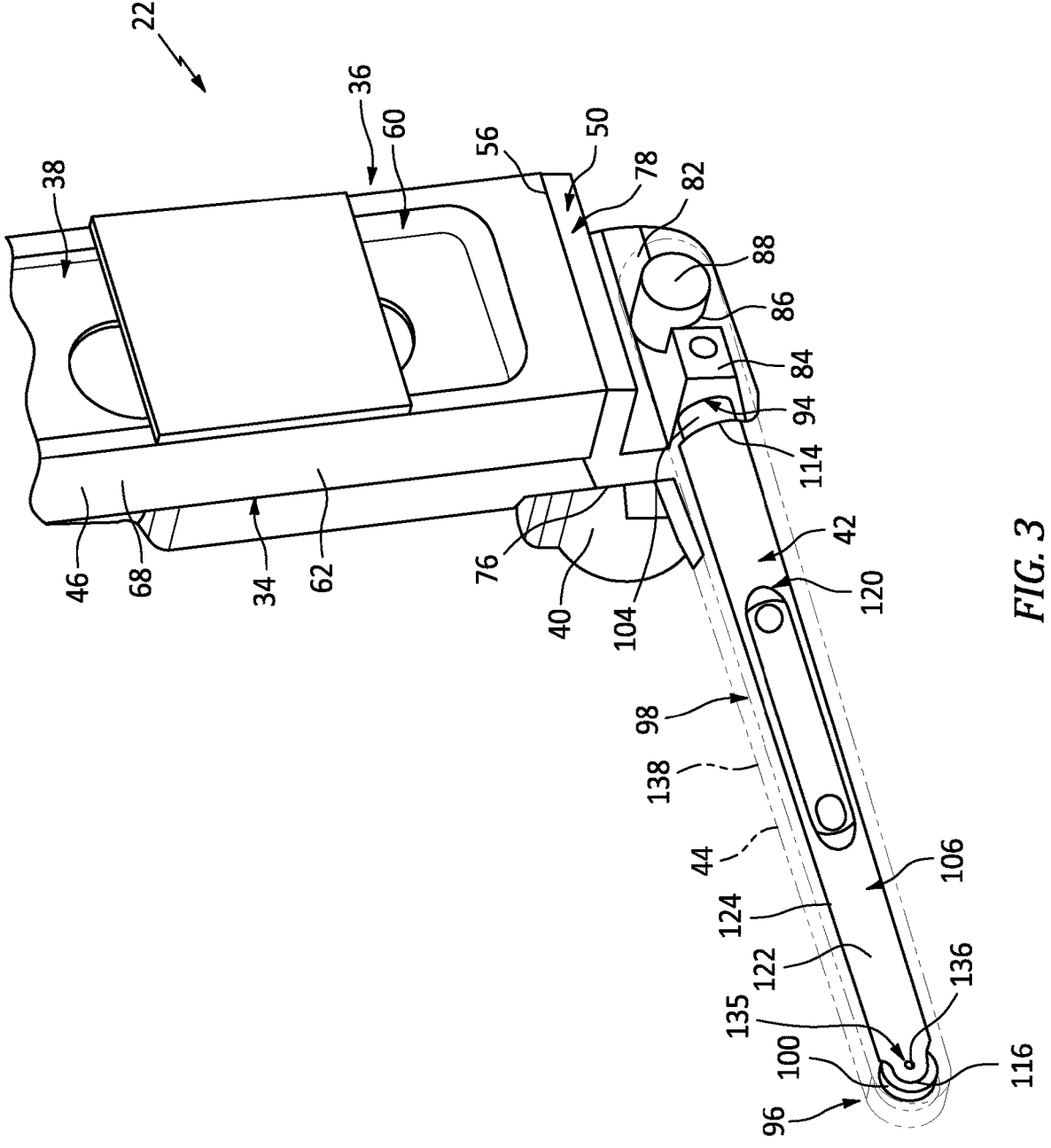
FIG. 3 illustrates another perspective view of an end effector for a polishing system, in accordance with one or more embodiments of the present disclosure.

FIGS. 2 and 3 illustrate perspective views of the end effector 22. The end effector 22 of FIGS. 2 and 3 has a first lateral side 34 and a second lateral side 36. The end effector 22 of FIGS. 2 and 3 includes a polishing arm 38, a motor 40, a tool head 42, and an abrasive belt 44. The polishing system 10 (see FIG. 1) may be configured to selectively attach and detach different end effectors 22 to facilitate polishing system 10 performance of different polishing processes or to replace degraded or faulty end effectors 22.

The polishing arm 38 of FIG. 2 includes an arm body 46, an attachment flange 48, and a motor housing 50. The arm body 46 extends (e.g., lengthwise) between and to a proximate end 54 of the arm body 46 and a distal end 56 of the arm body 46. The arm body 46 of FIG. 2 has a first lateral side 58, a second lateral side 60, a front side 62, and a rear side 64. Each of the first lateral side 58, the second lateral side 60, the front side 62, and the rear side 64 extend between and to the proximate end 54 and the distal end 56. The first lateral side 58 and the second lateral side 60 may respectively correspond with the first lateral side 34 and the second lateral side 36. The arm body 46 may include a first body portion 66 and a second body portion 68. The first body portion 66 may extend from the proximate end 54 to the second body portion 68. The second body portion 68 may extend from the first body portion 66 to the distal end 56. The first body portion 66 and the second body portion 68 may extend transversely relative to one another. For example, the first body portion 66 and the second body portion 68 may form an angle $\alpha 1$ of the arm body 46, which angle $\alpha 1$ may be understood to be disposed on an imaginary plane extending through the front side 62 and the rear side 64. The arm body 46 of FIG. 2 is illustrated with an angle $\alpha 1$ of approximately forty-five degrees (45°), however, the present disclosure is not limited to any particular angle $\alpha 1$ of the arm body 46. The angle $\alpha 1$ of the arm body 46 may facilitate positioning of the tool head 42 relative to the workpiece 1000 by the robotic arm 20 (see FIG. 1). The arm body 46 may form one or more apertures 70 extending through the arm body 46, for example, from the first lateral side 58 to the second lateral side 60. The apertures 70 may facilitate a reduction in weight of the arm body 46 while also facilitating access and directing pneumatic conduits, sensors cables, and the like for the end effector 22.

The attachment flange 48 is mounted to or otherwise disposed at (e.g., on, adjacent, or proximate) the proximate end 54. The attachment flange 48 is selectively attachable to the robotic arm 20, for example, at (e.g., on, adjacent, or proximate) the force control device 21.

The motor housing 50 is mounted to or otherwise disposed at (e.g., on, adjacent, or proximate) the distal end 56. The motor housing 50 has a first lateral side 76 and a second lateral side 78. The first lateral side 76 and the second lateral side 78 may respectively correspond with the first lateral side 34 and the second lateral side 36. The motor housing 50 includes a housing body 80. The housing body 80 of FIGS. 2 and 3 includes a first mount portion 82 and a second mount portion 84. The first mount portion 82 extends along the first lateral side 76. The first mount portion 82 forms a shaft aperture 86 through the first mount portion 82 in a direction from the first lateral side 76 toward the second lateral side 78. The first mount portion 82 is configured to receive and support the motor 40 at (e.g., on, adjacent, or proximate) the first lateral side 76. The second mount portion 84 extends (e.g., laterally extends) from the first mount portion 82 toward the second lateral side 78. The second lateral side 78 is open to allow the abrasive belt 44 to be installed on and removed from the motor 40.

The motor 40 is mounted to or otherwise disposed at (e.g., on, adjacent, or proximate) the motor housing 50. For example, the motor 40 of FIGS. 2 and 3 is mounted on the first mount portion 82 on the first lateral side 76. The motor 40 includes a rotatable shaft 88. The rotatable shaft 88 extends (e.g., laterally extends) through the shaft aperture 86 to an interior of the motor housing 50. The motor 40 is configured to rotate the rotatable shaft 88 to drive the abrasive belt 44 for a polishing process. The motor 40 of FIGS. 2 and 3 is configured as a pneumatic motor, which pneumatic motor is configured to be driven by a pressurized gas (e.g., air) directed to the motor 40 by a pneumatic conduit 90. The use of a pneumatic motor for the motor 40 may eliminate or reduce the occurrence of sparks during motor 40 operation, thereby facilitating improvements in safety for applications of the present disclosure polishing system 10 (see FIG. 1) which may generate quantities of volatile particulate such as titanium or other metal dust. The present disclosure, however, is not limited to the use of a pneumatic motor for the motor 40, and the motor 40 may alternatively be configured, for example, as an electric motor.

Figure 4:
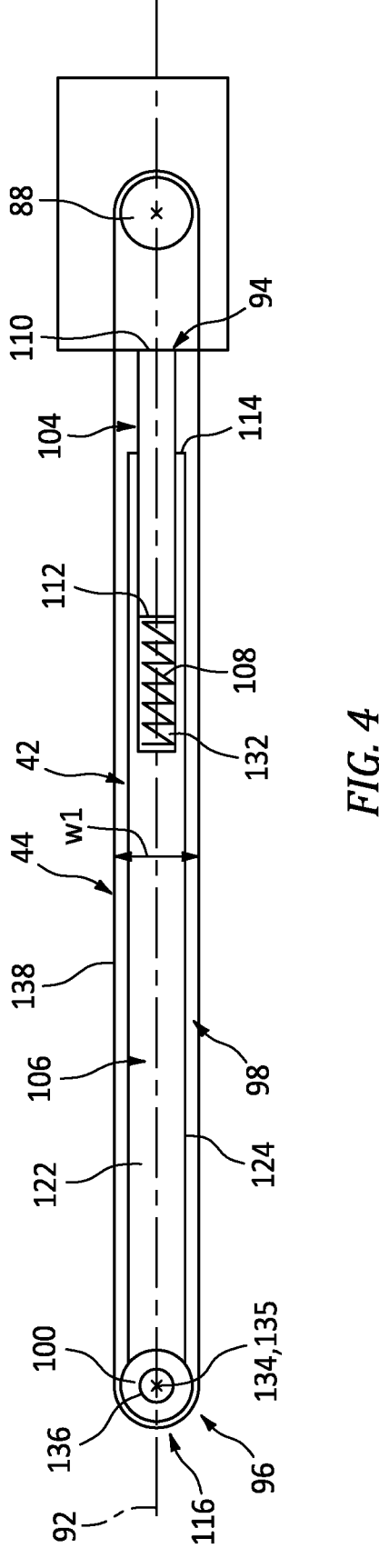
FIG. 4 illustrates a cutaway, side view of a portion of a tool head for a polishing system end effector, in accordance with one or more embodiments of the present disclosure.

Referring to FIGS. 2-4, the tool head 42 extends along a lengthwise axis 92 between and to an inner end 94 of the tool head 42 and a tip end 96 of the tool head 42. The inner end 94 is disposed at (e.g., on, adjacent, or proximate) the polishing arm 38 (e.g., the motor housing 50). The lengthwise axis 92 may extend orthogonally or substantially orthogonally relative to the arm body 46 (e.g., a lengthwise dimension of the second body portion 68). The present disclosure, however, is not limited to this particular orientation of the lengthwise axis 92 relative to the polishing arm 38. For example, the lengthwise axis 92 may be oriented at any suitable angle relative to the arm body 46 including a colinear orientation of the lengthwise axis 92 relative to the arm body 46. The tool head 42 of FIGS. 2-4 includes a belt tensioner 98 and a roller 100. The tool head 42 may additionally include a retaining shoulder screw 65 and a proximity sensor assembly 69.

The belt tensioner 98 includes a tool guide 104, a tool extension 106, and a biasing member 108. The tool guide 104 is disposed at (e.g., on, adjacent, or proximate) the inner end 94. The tool guide 104 extends (e.g., lengthwise) between and to a first end 110 of the tool guide 104 and a second end 112 of the tool guide 104. The first end 110 is mounted to or otherwise disposed at (e.g., on, adjacent, or proximate) the motor housing 50. For example, the first end 110 of FIGS. 2-4 is mounted (e.g., fixedly mounted) to the second mount portion 84. The tool guide 104 may be configured as a cylindrical body, however, the present disclosure is not limited to any particular shape of the tool guide 104.

The tool extension 106 is disposed at (e.g., on, adjacent, or proximate) the tip end 96. The tool extension 106 extends (e.g., lengthwise) between and to a first end 114 of the tool extension 106 and a second end 116 of the tool extension 106. The tool extension 106 has a first lateral side 118 and a second lateral side 120. The first lateral side 118 and the second lateral side 120 may respectively correspond with the first lateral side 34 and the second lateral side 36. The tool extension 106 includes an extension body 122 extending from the first end 114 to the second end 116.

The extension body 122 forms an internal bore 132 as shown, for example, in FIG. 4. The internal bore 132 extends from the first end 114 toward the second end 116. The internal bore 132 is configured to receive the tool guide 104 (e.g., the second end 112) and to facilitate axial translation (e.g., along the lengthwise axis 92) of the tool extension 106 relative to the tool guide 104.

The biasing member 108 of FIG. 4 is disposed within the internal bore 132. The biasing member 108 is disposed between (e.g., axially between) the tool guide 104 (e.g., the second end 112) and the extension body 122, with respect to the lengthwise axis 92. The biasing member 108 is configured to bias the tool extension 106 away from (e.g., axially away from) the tool guide 104 to apply a tension to the abrasive belt 44 installed on the tool head 42. The biasing member 108 of FIG. 4 is configured as a spring, however, the present disclosure is not limited to the use of a spring for the biasing member 108.

The retaining shoulder screw 65 is adjustably mounted to (e.g., screwed into) the motor housing 50 (e.g., the second mount portion 84) adjacent (e.g., radially adjacent with respect to the lengthwise axis 92) the tool head 42 (e.g., the tool guide 104 and the tool extension 106). The retaining shoulder screw 65 may include an enlarged head at a distal end of the retaining shoulder screw 65 opposite the motor housing 50. The extension body 122 may include or otherwise form a guiding feature 67. The guiding feature 67 may be disposed axially coincident with the retaining shoulder screw 65, relative to the lengthwise axis 92. As shown in FIG. 2, for example, the guiding feature 67 may include two arms projecting radially outward from the extension body 122, relative to the lengthwise axis. The two arms may form a U-shape body of the guiding feature 67, which U-shape body may partially circumscribe the retaining shoulder screw 65. In some embodiments, the guiding feature 67 may fully circumscribe the retaining shoulder screw 65 The present disclosure, however, is not limited to the foregoing exemplary configuration of the guiding feature 67. The guiding feature 67 may limit axial movement of the tool extension 106, relative to the lengthwise axis 92. For example, the retaining shoulder screw 65 and the guiding feature 67 may define a fully extended position of the tool extension 106 where the guiding feature 67 contacts the head of the retaining shoulder screw 65, thereby preventing further axial extension of the tool extension 106 from the biasing member 108. The guiding feature 67 may further limit or prevent circumferential movement of the extension body 122, thereby circumferentially fixing or substantially circumferentially fixing the extension body 122 relative to the motor housing 50 and/or the tool guide 104. The axial and circumferential guidance and restraint provided by the retaining shoulder screw 65 and the guiding feature 67 facilitates improved precision and repeatability for polishing operations using the present disclosure polishing arm 38.

The proximity sensor assembly 69 of FIG. 2 is disposed at (e.g., on, adjacent, or proximate) the housing body 50 (e.g., the second mount portion 84), the retaining shoulder screw 65, and the guiding feature 67. The proximity sensor assembly 69 may include a proximity sensor 71 (e.g., an inductive sensor) and a cover plate 73. The proximity sensor 71 may be disposed radially outward of the guiding feature 67, relative to the lengthwise axis 92. The proximity sensor 71 may be configured to contact the guiding feature 67 as the guiding feature 67 translates axially along the lengthwise axis 92. The proximity sensor 71 may be configured to identify a presence or an absence of the guiding feature 67 in proximity to the proximity sensor 71. For example, the proximity sensor 71 may identify a presence of the guiding feature 67 where the guiding feature 67 is disposed in contact with the proximity sensor 71 or in close proximity to the proximity sensor 71. The proximity sensor 71 may identify an absence of the guiding feature 67 where the guiding feature 67 is axially separated from the proximity sensor 71, for example, in the fully extended position of the tool extension 106 where the guiding feature 67 contacts the head of the retaining shoulder screw 65. The proximity sensor 71 may be connected in signal communication with the controller 14. The proximity sensor 71 may be positionally fixed relative to the housing body 50 by the cover plate 73.

The roller 100 is disposed at (e.g., on, adjacent, or proximate) the tip end 96. The roller 100 is configured to rotate about a rotational axis 134 disposed at a tool center point 135 of the tool head 42. The rotational axis 134 may extend (e.g., laterally extend) through the first lateral side 118 and the second lateral side 120. The roller 100 may be configured with a cylindrical shape, or torus shape, or another suitable shape for controlling movement of the abrasive belt 44. The rotational axis 134 (e.g., the tool center point 135) may be formed by a roller body 136 such as, but not limited to, a shaft, a pin, a dowel, or the like, about which the roller 100 may rotate.

The abrasive belt 44 is installed on the tool head 42 in rotational communication with the rotatable shaft 88 and the roller 100. The abrasive belt 44 includes an abrasive outer surface 138 which is configured for polishing, grinding, or otherwise machining one or more surfaces of a workpiece (e.g., the workpiece 1000). The abrasive outer surface 138 may be configured with a degree of abrasiveness (e.g., coarseness, grit, etc.) which may be selected for a particular polishing process or workpiece surface). Installed on the tool head 42, the abrasive belt 44 has a width w1 extending between opposing portions of the abrasive outer surface 138. The belt tensioner 98 applies a suitable tension to the abrasive belt 44 to secure the abrasive belt 44 on the rotatable shaft 88 and the roller 100 and to allow the abrasive belt 44 to be driven (e.g., moved) along a path between the rotatable shaft 88 and the roller 100 by rotation of the rotatable shaft 88.

The controller 14 of FIG. 1 is connected in signal communication with the robotic polishing assembly 12. The controller 14 includes a processor 140 and memory 142. The memory 142 is connected in signal communication with the processor 140. The processor 140 may include any type of computing device, computational circuit, or any type of process or processing circuit capable of executing a series of instructions that are stored in the memory 142, thereby causing the processor 140 to perform or control one or more steps or other processes. The processor 140 may include multiple processors and/or multicore CPUs and may include any type of processor, such as a microprocessor, digital signal processor, co-processors, a micro-controller, a micro-computer, a central processing unit, a field programmable gate array, a programmable logic device, a state machine, logic circuitry, analog circuitry, digital circuitry, etc., and any combination thereof. The instructions stored in memory 142 may represent one or more algorithms for controlling aspects of the robotic polishing assembly 12, and the stored instructions are not limited to any particular form (e.g., program files, system data, buffers, drivers, utilities, system programs, etc.) provided they can be executed by the processor 140. The instructions stored in memory 142 may be in the form of G-code, M-code, or another suitable programming language which can be executed by the controller 14 and/or its processor 140. The instructions stored in memory 142 may be generated by computer-aided design (CAD) or computer-aided manufacturing (CAM) software, whereby the physical dimensions of a particular workpiece (e.g., the workpiece 1000) may be translated into instructions (e.g., computer numerical control (CNC) instructions) for execution by the robotic polishing assembly 12. The memory 142 may be a non-transitory computer readable storage medium configured to store instructions that when executed by one or more processors, cause the one or more processors to perform or cause the performance of certain functions. The memory 142 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 14 may be achieved via the use of hardware, software, firmware, or any combination thereof. The controller 14 may also include input and output devices (e.g., keyboards, buttons, switches, touch screens, video monitors, sensor readouts, data ports, etc.) that enable the operator to input instructions, receive data, etc.

Figures 5, 6:
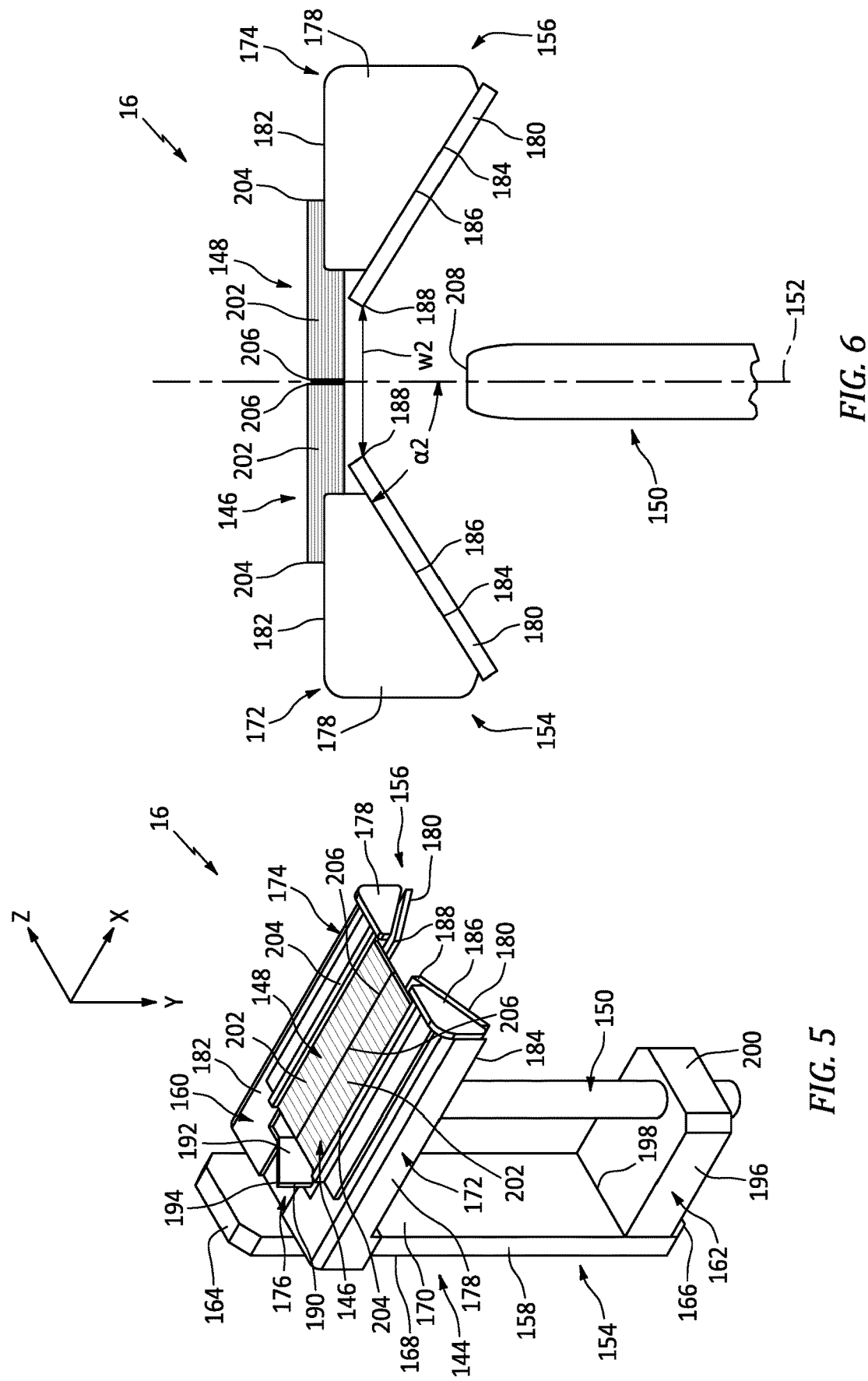
FIG. 5 illustrates a perspective view of a belt removal assembly for a polishing system, in accordance with one or more embodiments of the present disclosure.
FIG. 6 illustrates a front view of a portion of the belt removal assembly of FIG. 5, in accordance with one or more embodiments of the present disclosure.

FIGS. 5 and 6 illustrate the belt removal assembly 16. The belt removal assembly 16 of FIGS. 5 and 6 includes a frame

144, a first lateral brush 146, a second lateral brush 148, and a belt retention member 150. Aspects of the present disclosure belt removal assembly 16 may be described herein with respect to a center plane 152 of the belt removal assembly 16. The center plane 152 may be understood to extend along an x-axis (e.g., a longitudinal direction) and a y-axis (e.g., a vertical direction). A z-axis may be understood to represent a lateral direction which is perpendicular to the center plane 152. The center plane 152 may subdivide a first lateral side 154 of the belt removal assembly 16 from a second lateral side 156 of the belt removal assembly 16. The belt removal assembly 16 may be generally symmetrical with respect to the center plane 152, however, the present disclosure is not limited to such a configuration.

The frame 144 of FIG. 5 includes a back portion 158, a belt removal portion 160, and a belt retention portion 162. The back portion 158 extends (e.g., vertically extends) between a first vertical end 164 of the back portion 158 and a second vertical end 166 of the back portion 158. The first vertical end 164 may generally be understood to be located above (e.g., with respect to a gravitational force) the second vertical end 166. The back portion 158 extends (e.g., longitudinally extends) between a back side 168 of the back portion 158 and a front side 170 of the back portion 158. The back side 168 may be configured to be mounted to or otherwise disposed at (e.g., on, adjacent, or proximate) a wall or other fixed structure in proximity to (e.g., within reach of) the robotic polishing assembly 12 (see FIG. 1).

The belt removal portion 160 of FIG. 5 is mounted to the front side 170 and disposed at (e.g., on, adjacent, or proximate) the first vertical end 164. The belt removal portion 160 of FIG. 5 includes a first lateral arm 172, a second lateral arm 174, and a back stop 176. The first lateral arm 172 and the second lateral arm 174 extend (e.g., longitudinally extend) outward from the front side 170. The first lateral arm 172 is laterally spaced from the second lateral arm 174. Each of the first lateral arm 172 and the second lateral arm 174 include an arm body 178 and a belt removal panel 180. The arm body 178 includes a top side 182 a bottom side 184. The bottom side 184 includes a bottom surface 186 which may extend in a transverse direction relative to the center plane 152. The transverse direction may have a longitudinal component and a vertical component such that the bottom surface 186 extends at an angle α2 relative to the center plane 152 and the angle α2 is less than ninety degrees (90°). The present disclosure, however, is not limited to the particular orientation of the bottom surface 186 of FIGS. 5 and 6. The belt removal panel 180 is mounted to or otherwise disposed at (e.g., on, adjacent, or proximate) the bottom surface 186. The belt removal panel 180 may generally extend in the transverse direction of the bottom surface 186. The belt removal panel 180 includes an engagement end 188 disposed laterally inward (e.g., toward the center plane 152) of the arm body 178. The engagement end 188 extends in a longitudinal direction parallel to or substantially parallel to the center plane 152. The engagement end 188 of the belt removal panel 180 for the first lateral arm 172 is laterally spaced from the engagement end 188 of the belt removal panel 180 for the second lateral arm 174 by a width w2. The width w2 is less than the width w1. The belt removal panel 180 may include a panel material (e.g., a wear resistant material) which is different than a body material of the arm body 178. The belt removal panel 180 may alternatively be formed by a portion of the arm body 178 as a unitary structure.

The back stop 176 is disposed laterally between the first lateral arm 172 and the second lateral arm 174 at the back portion 158. The back stop 176 includes a first back stop surface 190 and a second back stop surface 192. The first back stop surface 190 and the second back stop surface 192 of FIG. 5 extend transverse to one another and intersect to form a substantially V-shaped notch. An intersection 194 of the first back stop surface 190 and the second back stop surface 192 may extend vertically along the center plane 152.

The belt retention portion 162 includes a base 196 mounted to the front side 170 and disposed at (e.g., on, adjacent, or proximate) the second vertical end 166. The base 196 extends (e.g., longitudinally extends) between a first end 198 of the base 196 and a second end 200 of the base 196. The first end 198 is disposed at (e.g., on, adjacent, or proximate) the front side 170. The second end 200 is disposed longitudinally outward from the first end 198.

The first lateral brush 146 and the second lateral brush 148 are mounted to or otherwise disposed at (e.g., on, adjacent, or proximate) the belt removal portion 160. For example, the first lateral brush 146 may be mounted on the arm body 178 of the first lateral arm 172 at (e.g., on, adjacent, or proximate) the top side 182. Similarly, the second lateral brush 148 may be mounted on the arm body 178 of the second lateral arm 174 at (e.g., on, adjacent, or proximate) the top side 182. Accordingly, the first lateral brush 146 and the second lateral brush 148 may be disposed vertically adjacent the engagement end 188 of the belt removal panel 180 for each of the first lateral arm 172 and the second lateral arm 174. Each of the first lateral brush 146 and the second lateral brush 148 include a plurality of bristles 202 extending between a base end 204 of the bristles 202 and a distal end 206 of the bristles 202. The base end 204 and the distal end 206 extend in a generally longitudinal direction along the first lateral arm 172 and the second lateral arm 174. The distal end 206 is disposed at (e.g., on, adjacent, or proximate) the center plane 152.

The belt retention member 150 is configured to collect and retain the abrasive belt 44 after the abrasive belt 44 has been removed from the tool head 42 (see FIGS. 2 and 3). The belt retention member 150 of FIG. 5 is mounted to or otherwise disposed at (e.g., on, adjacent, or proximate) the base 196 (e.g., at the second end 200). The belt retention member 150 of FIGS. 5 and 6 is configured as a post extending upward (e.g., vertically upward) from the base 196 toward the belt removal portion 160. The present disclosure, however, is not limited to the configuration of the belt retention member 150 as illustrated in FIGS. 5 and 6 and the belt retention member 150 may alternatively be configured as a hook, receptacle, or other structure configured to catch and retain the abrasive belt 44. The belt retention member 150 of FIGS. 5 and 6 extends upward from the base 196 to a distal end 208. The distal end 208 is disposed vertically below the engagement ends 188.

Figure 7:
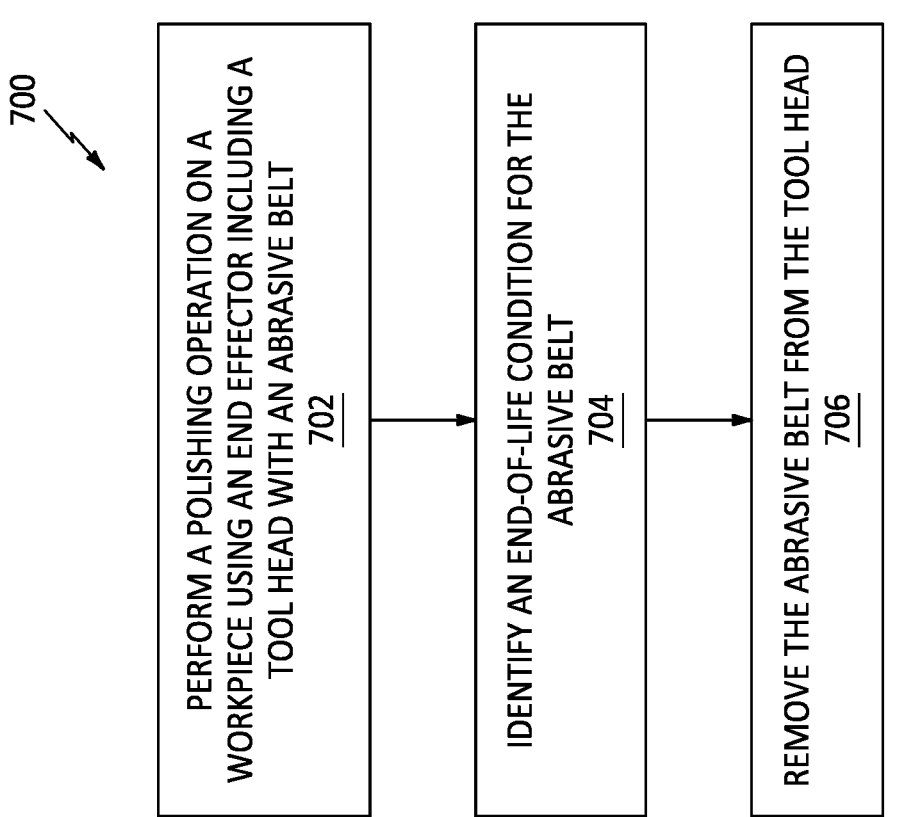
FIG. 7 illustrates a block diagram depicting a method for removing an abrasive belt from a tool head for a polishing system end effector, in accordance with one or more embodiments of the present disclosure.

Referring to FIGS. 1, 7, and 8, a Method 700 for removing an abrasive belt from the tool head of a robotic polishing system end effector is provided. FIG. 7 illustrates a flowchart for the Method 700. The Method 700 may be performed for the polishing system 10, as described herein. The controller 14 may be used to execute or control one or more steps of the Method 700. For example, the processor 140 may execute instructions stored in memory 142, thereby causing the controller 14 and/or its processor 140 to execute or otherwise control one or more steps of the Method 700 using the robotic polishing assembly 12. However, it should be understood that the Method 700 is not limited to use with the polishing system 10 described herein. Unless otherwise noted herein, it should be understood that the steps of Method 700 are not required to be performed in the specific sequence in which they are discussed below and, in various embodiments, the steps of Method 700 may be performed separately or simultaneously. Further, it should be understood that not all of the steps of the method 700, discussed below, may be required unless otherwise described herein.

Step 702 includes performing a polishing process on the workpiece 1000 with the robotic polishing assembly 12 and its end effector 22. Pressurized gas (e.g., air) is supplied to the motor 40, thereby driving the rotatable shaft 88 and, in turn, the abrasive belt 44. The controller 14 may execute a series of instructions (e.g., a CNC polishing program) to control the robotic polishing assembly 12 to polish or otherwise machine one or more surfaces of the workpiece 1000. As the abrasive belt 44 is used during one or more polishing processes, the abrasive belt 44 will experience gradual degradation (e.g., wear). Degradation of the abrasive belt 44 may be exhibited, for example, by stretching of the abrasive belt 44 and/or erosion of the abrasive outer surface 138. After sufficient usage, the abrasive belt 44 may no longer be suitable for further polishing processes.

Step 704 includes identifying (e.g., with the controller 14) an end-of-life condition is present or absent for the abrasive belt 44. Abrasive belt 44 usage may be measured or estimated to identify the end-of-life condition for the abrasive belt 44. For example, abrasive belt 44 usage may be determined using a polishing process time for the abrasive belt 44 (e.g., an amount of time in which the abrasive belt 44 is applied to the workpiece 1000), a surface area of the workpiece 1000 which has been polished using the abrasive belt 44, or any other suitable indicator of abrasive belt 44 usage. The polishing process time, polishing surface area, or other quantifiable usage value may be compared to a usage threshold value (e.g., a predetermined threshold value) to identify that the end-of-life condition is present or absent for the abrasive belt 44. The abrasive belt 44 usage threshold value may be determined analytically and/or experimentally and may vary depending, for example, on the abrasive belt 44 configuration (e.g., abrasive belt 44 material, coarseness, etc.), workpiece 1000 material, and/or the particular polishing process (e.g., polishing process intensity for the abrasive belt 44). Routine experimentation may be performed by a person of ordinary skill in the art to determine a suitable usage threshold value for identifying an end-of-life condition is present for the abrasive belt 44 in accordance with an as informed by one or more aspects of the present disclosure.

Step 706 includes removing the abrasive belt 44 from the end effector 22 (e.g., the tool head 42). Identification of the end-of-life condition (see Step 704) for the abrasive belt 44 may cause the controller 14 to control the robotic polishing assembly 12 to remove the abrasive belt 44 from the end effector. Identification of the end-of-life condition may cause the controller 14 to stop a polishing process and initiate removal of the abrasive belt 44. Alternatively, identification of the end-of-life condition may cause the controller 14 to control the robotic polishing assembly 12 to complete a polishing process for one or more surfaces or surface portions of the workpiece 1000 and then initiate removal of the abrasive belt 44.

Figures 8A, 8B, 8C:
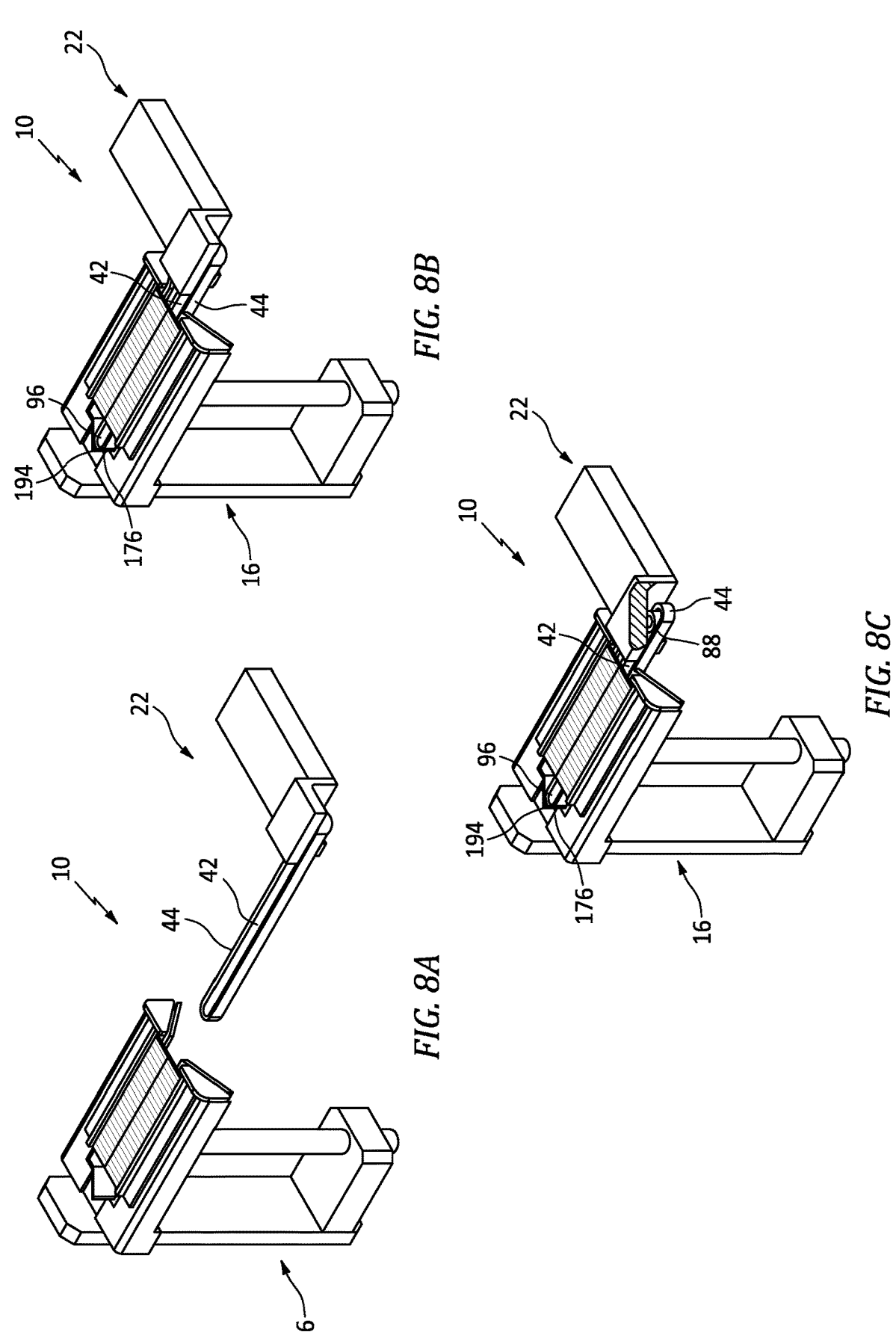
FIGS. 8A-E sequentially illustrate perspective views of a belt removal assembly and a polishing system end effector for an abrasive belt removal process, in accordance with one or more embodiments of the present disclosure.
Figures 8D, 8E:
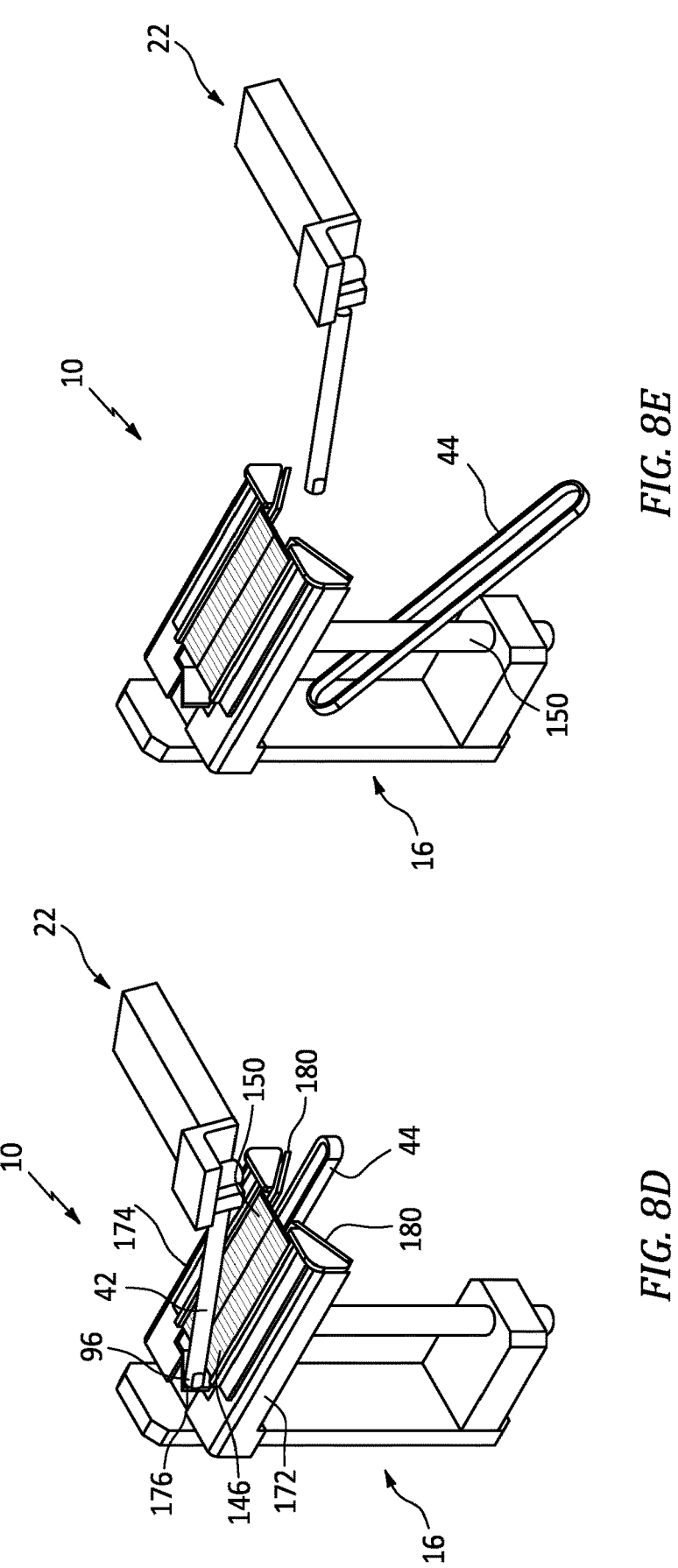

FIGS. 8A-E illustrate perspective views of portions of the polishing system 10 at various sequential stages of an abrasive belt removal process. In particular, FIGS. 8A-E illustrate portions of the end effector 22 relative to the belt removal assembly 16. To remove the abrasive belt 44 from the end effector 22, the controller 14 may first control the robotic polishing assembly 12 to position the tool head 42 for insertion into the belt removal assembly 16, as shown in FIG. 8A. The tool head 42 may be positioned with the rotational axis 134 (see FIG. 4) extending vertically or substantially vertically. The lengthwise axis 92 and the rotational axis 134 may generally extend along the center plane 152 (see FIGS. 4 and 6). The tool head 42 may be inserted (e.g., longitudinally inserted) into the belt removal assembly 16 until the tip end 96 contacts the back stop 176 at (e.g., on, adjacent, or proximate) the intersection 194, as shown in FIG. 8B. The controller 14 may control the robotic polishing assembly 12 to push the tip end 96 into the back stop 176 compressing the belt tensioner 98 (e.g., the biasing member 108, see FIG. 4), thereby loosening the abrasive belt 44 on the tool head 42. The retaining shoulder screw 65 and the guiding feature 67 may facilitate positioning of the belt tensioner 98 (e.g., the tool extension 106) in a suitable biased position (e.g., a fully extended position) prior to engagement between the tip end 96 and the back stop 176. The cutaway view of FIG. 8C illustrates the loosened abrasive belt 44 which has been partially displaced from the rotatable shaft 88. With the tip end 96 pressed against the back stop 176, the controller 14 may control the robotic polishing assembly 12 to rotate the end effector 22 vertically upward about the tip end 96, as shown in FIG. 8D. As the end effector 22 rotates, the tool head 42 may pass between the first lateral arm 172 and the second lateral arm 174. The belt removal panel 180 (e.g., the engagement end 188, see FIGS. 5 and 6) for the first lateral arm 172 and the second lateral arm 174 may obstruct passage of the abrasive belt 44 causing the abrasive belt 44 to be removed from the tool head 42 and to fall onto the belt retention member 150, as shown in FIGS. 8D and 8E. The controller 14 may verify removal of the abrasive belt 44 from the tool head 42 using the proximity sensor 71. For example, removal of the abrasive belt 44 from the tool head 42 may cause the biasing member 108 to bias the tool extension 106 in the fully extended position (e.g. with the guiding feature 67 disposed in contact with the head of the retaining shoulder screw 65). In this fully extended position of the tool extension 106, the controller 14 may identify the absence of the guiding feature 67 in proximity to the proximity sensor 71, thereby verifying that the abrasive belt 44 has been removed from the tool head 42. As the end effector 22 rotates, the tool head 42 may pass between and through the first lateral brush 146 and the second lateral brush 148, thereby removing dust and other particulate matter which may have accumulated on the tool head 42 and facilitating preparation of the tool head 42 for installation of a new abrasive belt 44.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A polishing system comprising:
   a robotic polishing assembly including an end effector, the end effector including a polishing arm, a motor, and a tool head, the motor mounted on the polishing arm, the tool head extending along a lengthwise axis between and to an inner end and a tip end, the inner end disposed on the polishing arm at the motor, the tool head including a belt tensioner, a roller, and an abrasive belt, the belt tensioner configured to bias the tip end outward from the inner end along the lengthwise axis, the abrasive belt disposed on the motor and the roller;

a belt removal assembly including a first lateral arm, a second lateral arm, and a back stop disposed laterally between the first lateral arm and the second lateral arm; and a controller in signal communication with the robotic polishing assembly, the controller including a processor in communication with a non-transitory memory storing instructions, which instructions when executed by the processor, cause the processor to:

identify an end-of-life condition is present for the abrasive belt using a usage threshold value for the abrasive belt; and in response to identifying the end-of-life condition, remove the abrasive belt from the tool head by controlling the robotic polishing assembly to position the tool head within the belt removal assembly, compress the belt tensioner against the back stop, and move the tool head between the first lateral arm and the second lateral arm.

2. The polishing system of claim 1, wherein the back stop includes a first back stop surface and a second back stop surface, the first back stop surface and the second back stop surface forming a notch.

3. The polishing system of claim 1, wherein the belt removal assembly further includes a first lateral brush and a second lateral brush, the first lateral brush disposed on the first lateral arm and the second lateral brush disposed on the second lateral arm.

4. The polishing system of claim 1, wherein the robotic polishing assembly further includes a robotic arm, the robotic arm including a plurality of movable joints extending between and to a base end and a distal end, the end effector disposed at the distal end.

5. The polishing system of claim 1, wherein the belt removal assembly further includes a belt retention member configured to retain the abrasive belt after the abrasive belt has been removed from the tool head, the belt retention member including a post extending upward to a distal end, distal end disposed vertically below the first lateral arm and the second lateral arm.

6. The polishing system of claim 1, wherein the first lateral arm includes a first belt removal panel and the second lateral arm includes a second belt removal panel, the first belt removal panel extending in a transverse direction relative to the second belt removal panel.

7. The polishing system of claim 6, wherein the first belt removal panel includes a first engagement end, the second belt removal panel includes a second engagement end, the abrasive belt has a first width, the first engagement end is laterally spaced from the second engagement end by a second width, and the first width is greater than the second width.

8. The polishing system of claim 1, wherein the belt tensioner includes a tool guide, a tool extension, and a biasing member, the tool guide disposed at the inner end, the tool extension disposed at the tip end, and the biasing member configured to bias the tool extension outward from the tool guide along the lengthwise axis.

9. The polishing system of claim 1, wherein the instructions, when executed by the processor, further cause the processor to identify the end-of-life condition by comparing a measured abrasive belt usage value of the abrasive belt to the usage threshold value, wherein the usage threshold value is a predetermined usage threshold value stored in memory.

10. The polishing system of claim 1, wherein the instructions, when executed by the processor, further cause the processor to move the tool head between the first lateral arm and the second lateral arm by rotating the end effector about the tip end with the tip end pressed against the back stop so that the tool head passes between the first lateral arm and the second lateral arm.

11. A method for removing an abrasive belt from a tool head of an end effector for a robotic polishing system, the method comprising:

identifying an end-of-life condition is present for the abrasive belt; and in response to identifying the end-of-life condition, removing the abrasive belt from the tool head by:

positioning the tool head within a belt removal assembly, the belt removal assembly including a first lateral arm, a second lateral arm, and a back stop disposed laterally between the first lateral arm and the second lateral arm;

loosening the abrasive belt on the tool head by pushing the tool head against the back stop; and moving the tool head between the first lateral arm and the second lateral arm.

12. The method of claim 11, wherein the belt removal assembly further includes a first lateral brush and a second lateral brush, the first lateral brush disposed on the first lateral arm and the second lateral brush disposed on the second lateral arm, the method further comprising:

moving the tool head between and through the first lateral brush and the second lateral brush.

13. The method of claim 11, further comprising collecting the removed abrasive belt with a belt retention member.

14. The method of claim 11, wherein identifying the end-of-life condition is present for the abrasive belt includes comparing a measured abrasive belt usage value for the abrasive belt to a predetermined usage threshold value.

15. The method of claim 11, wherein:

the back stop includes a first back stop surface and a second back stop surface, the first back stop surface and the second back stop surface forming a notch; and wherein pushing the tool head against the back stop includes positioning the tool head within the notch.

16. A belt removal assembly comprising:

a back portion;

a first lateral arm extending longitudinally outward from the back portion, the first lateral arm including a first arm body and a first belt removal panel, the first arm body including a first top side and a first bottom side, the first belt removal panel disposed on the first bottom side;

a second lateral arm extending longitudinally outward from the back portion, the second lateral arm laterally spaced from the first lateral arm, the second lateral arm including a second arm body and a second belt removal panel, the second arm body including a second top side and a second bottom side, the second belt removal panel disposed on the second bottom side; and a back stop disposed at the back portion laterally between the first lateral arm and the second lateral arm, the back stop including a first back stop surface and a second back stop surface, the first back stop surface and the second back stop surface forming a notch at an intersection of the first back stop surface and the second back stop surface, the intersection extending vertically between the first lateral arm and the second lateral arm.

17. The belt removal assembly of claim 16, further comprising a first lateral brush and a second lateral brush, the first lateral brush disposed on the first top side and the second lateral brush disposed on the second top side.

18. The belt removal assembly of claim 16, wherein the first belt removal panel extends in a transverse direction relative to the second belt removal panel.

19. The belt removal assembly of claim 16, further comprising a belt retention member disposed laterally between the first lateral arm and the second lateral arm.

20. The belt removal assembly of claim 19, wherein the belt retention member includes a post extending upward to a distal end, the distal end disposed vertically below the first lateral arm and the second lateral arm.

* * * * *